United States Patent [19]

Yoo

[11] Patent Number: 5,726,628
[45] Date of Patent: Mar. 10, 1998

[54] METAL DETECTOR SYSTEM

[75] Inventor: Steven Yoo, Lakewood, Calif.

[73] Assignee: GD Electronics, Inc., Torrance, Calif.

[21] Appl. No.: 643,326

[22] Filed: May 6, 1996

[51] Int. Cl.⁶ ........................................... G08B 13/24
[52] U.S. Cl. ..................... 340/551; 340/572; 324/239; 324/243
[58] Field of Search .................................. 340/551, 572, 340/945, 568; 324/239, 234, 207.26, 243, 165, 207.17, 326

[56] References Cited

U.S. PATENT DOCUMENTS

| | | | |
|---|---|---|---|
| 3,697,972 | 10/1972 | Brown | 340/551 X |
| 3,707,672 | 12/1972 | Miller et al. | 340/568 X |
| 3,758,849 | 9/1973 | Susman et al. | 340/551 X |
| 3,763,424 | 10/1973 | Bennett, Jr. et al. | 324/226 |
| 3,950,696 | 4/1976 | Miller et al. | 324/234 |
| 4,675,658 | 6/1987 | Anderson et al. | 340/551 |
| 4,677,384 | 6/1987 | Payne | 324/329 |
| 4,779,048 | 10/1988 | Aichele | 340/547 X |
| 4,821,023 | 4/1989 | Parks | 340/551 |
| 5,121,105 | 6/1992 | Aittoniemi | 340/572 |
| 5,397,986 | 3/1995 | Conway et al. | 324/243 |
| 5,406,259 | 4/1995 | Manneschi | 340/561 |
| 5,521,583 | 5/1996 | Frahm et al. | 340/551 |

Primary Examiner—Jeffery Hofsass
Assistant Examiner—Anh La
Attorney, Agent, or Firm—John K. Park; Law Offices of John K. Park & Assoc.

[57] ABSTRACT

A metal detector system is described for detecting metal objects in a monitoring zone, where the metal detector system comprises: (a) a transmitter coil for generating a magnetic filed in the zone to be monitored, the coil being disposed on a first side of the zone; (b) a first sensing coil disposed on a second side of the zone opposed to the first side, the first sensing coil generating a first sensing signal in response to perturbations in the magnetic field caused by the presence of a metallic object in the zone; (c) a second sensing coil disposed on the second side of the zone, the second sensing coil being spaced apart from the first sensing coil, the second sensing coil generating a second sensing signal in response to perturbations in the magnetic field caused by the presence of a metallic object in the zone; and (d) a sensing circuit for comparing the amplitudes of the first and second sensing signals to generate a difference signal and for generating a first trigger signal for a zero downcrossing of the difference signal and for generating a second trigger signal for a zero uncrossing of the difference signal, wherein the trigger signals indicate direction of travel of a metal object in the zone in relation to the first and second sensing coils.

15 Claims, 9 Drawing Sheets

FIG. 6

TRANSMITTER CIRCUIT

FIG. 7 HIGH PASS FILTER (ACTIVE FILTER) AND AMP.

METAL DETECTOR SYSTEM

BACKGROUND

The present invention generally relates to metal detector systems, and in particular to metal detector systems used in detecting firearms.

Metal detector systems are utilized in airports and security buildings to detect transport of weapons by individuals. Increasingly, metal detector systems are used to detect presence of firearms on individuals and in carry in luggage. Existing detector systems employ a transmitter coil energized by a transmitter circuit to generate a magnetic field in a zone to be monitored. A sensing coil and sensing circuit are used to detect presence of a metal object in the zone by comparing perturbations in the magnetic field caused by the presence of the metal object to a threshold value. An alarm is activated when the threshold value is exceeded, informing a user of the presence of the metallic object.

Existing metal detector system have several important disadvantages however. One such disadvantage is the inability of such systems to determine whether a metal object is being carried into a secured area or out of the secured area. In many instances it is immaterial whether a metal object is carried out of the secured area, and there is only interest in such objects being carried into the secured area. Therefore, the ability to determine direction of travel of a metal object into or out of a secured area is highly desirable.

Another disadvantage of existing systems is their inability to distinguish between harmless metal objects such as keys, coins, jewelry, and accessories as opposed to firearms. In many instances, an individual is forced to empty his or her pockets or remove items of jewelry and accessories because the detection system has unnecessarily sounded an alarm due to the presence of such harmless objects. Existing systems are unable to accurately differentiate between firearms and benign metal objects.

Yet another disadvantage of existing systems is the limited vertical area they can monitor. Typically such systems can only detect metal objects in a vertical area limited to about one foot. Therefore, concealed weapons outside the vertical range of the detectors are not detected. It is highly desirable for the detector systems to have a broader vertical range for proper detection of metal objects carried by individuals.

There is, therefore, a need for a metal detector system which can determine the direction of travel of a metal object into or out of a secured area. There is also a need for such a system to accurately differentiate between forearms and benign metal objects There is also a need for such a system to have a broad vertical range to more conclusively detect presence of metal objects on individuals.

SUMMARY

The present invention satisfies these needs. The present invention provides a metal detector system for detecting metal objects in a monitoring zone, where the metal detector system comprises: (a) a transmitter coil for generating a magnetic field in the zone to be monitored, the coil being disposed on a first side of the zone; (b) a first sensing coil disposed on a second side of the zone opposed to the first side, the first sensing coil generating a first sensing signal in response to perturbations in the magnetic field caused by the presence of a metallic object in the zone; (c) a second sensing coil disposed on the second side of the zone, the second sensing coil being spaced apart from the first sensing coil, the second sensing coil generating a second sensing signal in response to perturbations in the magnetic field caused by the presence of a metallic object in the zone.

The detector system further includes a sensing circuit for comparing the amplitudes of the first and second sensing signals to generate a difference signal and for generating a first trigger signal for a zero down-crossing of the difference signal and for generating a second trigger signal for a zero up-crossing of the difference signal, wherein the trigger signals indicate direction of travel of a metal object in the zone in relation to the first and second sensing coils.

Preferably, the sensing circuit comprises: (a) a differential amplifier responsive to the first and second sensing signals for generating the difference signal representative of the difference between the amplitude of the first and second sensing signals; and (b) a detector responsive to the differential amplifier for detecting a zero down-crossing of the difference signal to generate the first trigger signal and for detecting a zero up-crossing of the difference signal to generate the second trigger signal.

The detector system further comprises a transmitter circuit electrically connected to the transmitter coil for exciting the transmitter coil to generate a magnetic field in the zone, the transmitter circuit including an oscillator circuit for generating excitation signals of a frequency of about 1 KHz to about 1.5 KHz for detecting tungsten alloys present in firearm barrels. As such, advantageously, the detector system of the present invention can differentiate between firearms and other metal objects.

Preferably, the first and second sensing coils each comprise a plurality of sensor coils electrically connected in series to form a substantially linear array of coils, wherein adjacent sensor coils are spaced from one another. This arrangement, advantageously, provides a broader vertical detection range for the detect system.

DRAWINGS

These and other features, aspects and advantages of the present invention will become understood with reference to the following description, appended claims and accompanying drawings where:

DESCRIPTION

Figure 1:
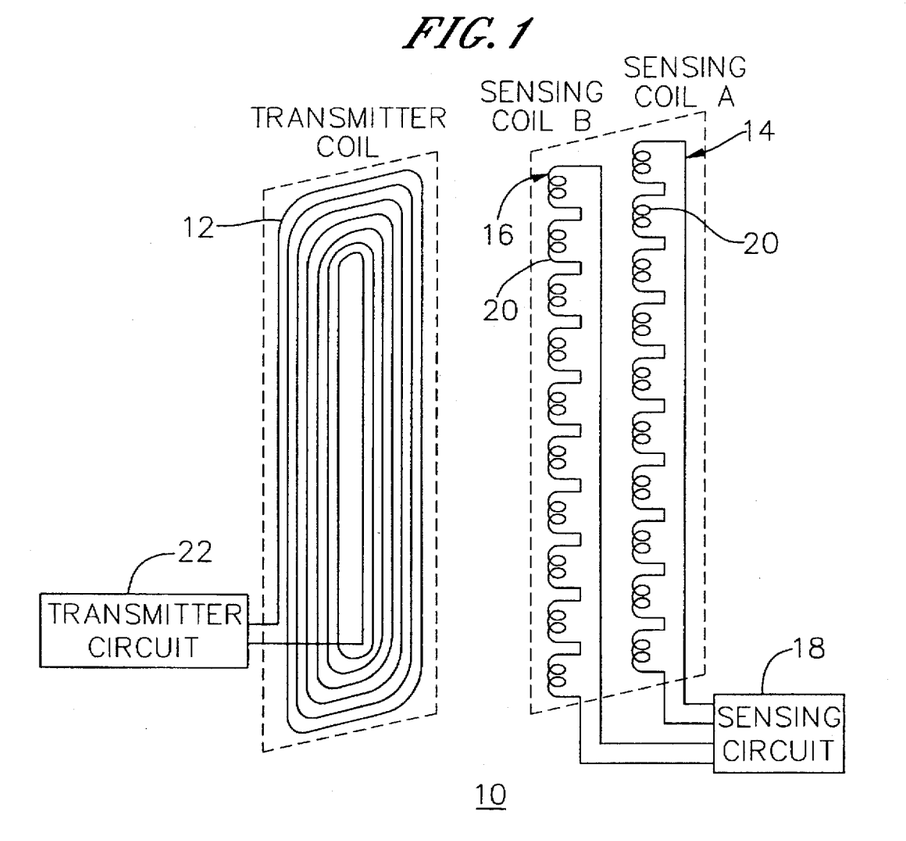
FIG. 1 is a perspective view of an embodiment of a metal detector system according to the present invention.
Figure 2:
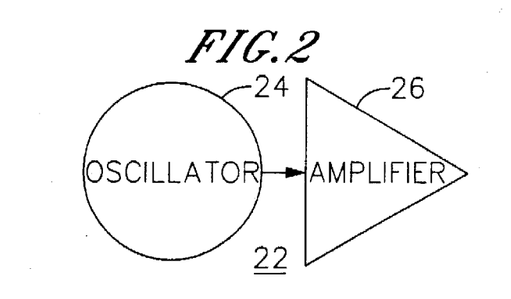
FIG. 2 is a block diagram of the transmitter circuit of the detector system of FIG. 1.
Figure 3:
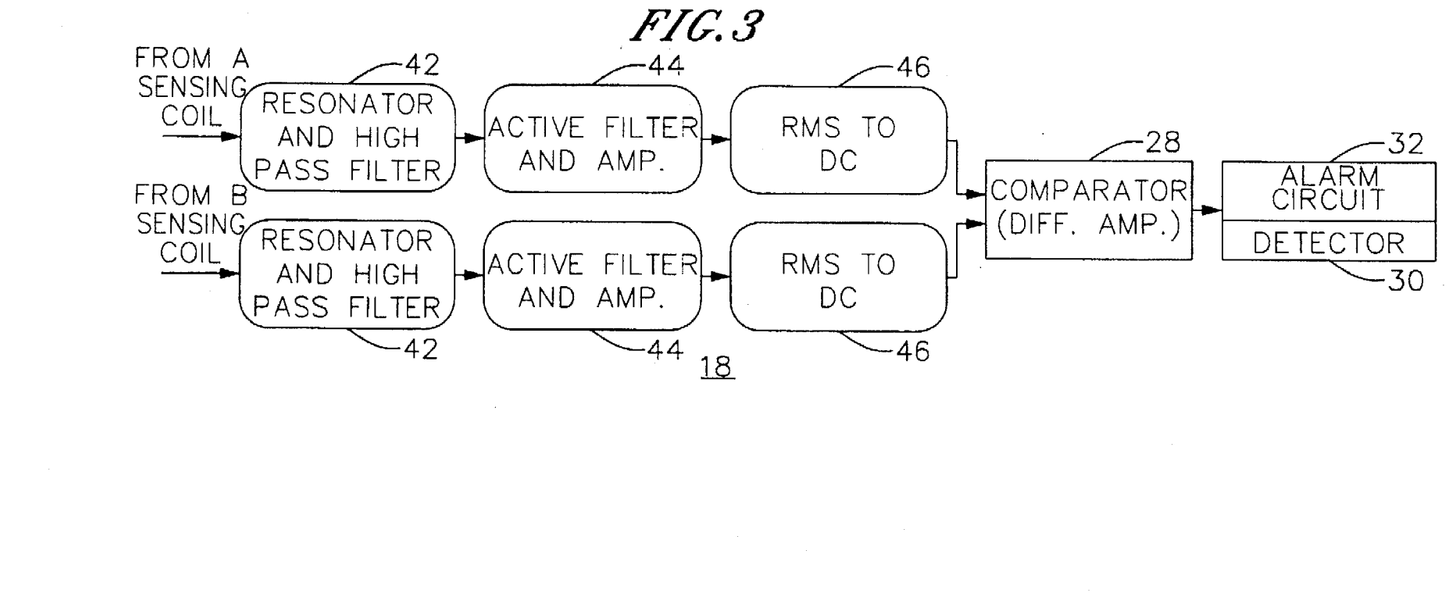
FIG. 3 is a block diagram of the sensing circuit of the metal detector system of FIG. 1.

Referring to FIGS. 1-3, an embodiment of a metal detector system 10 for detecting metal objects in a monitoring zone according to the present invention is described. The metal detector system 10 comprises: (a) a transmitter coil 12 for generating a magnetic filed in the zone to be monitored, the coil 12 being disposed on a first side of the zone; (b) a first sensing coil 14 disposed on a second side of the zone opposed to the first side, the first sensing coil 14 generating a first sensing signal in response to perturbations in the magnetic field caused by the presence of a metallic object in the zone; and (c) a second sensing coil 16 disposed on the second side of the zone, the second sensing coil 16 being spaced apart from the first sensing coil 14, the second sensing coil 16 generating a second sensing signal in response to perturbations in the magnetic field caused by the presence of a metallic object in the zone.

The detector system 10 further includes a sensing circuit 18 for comparing the amplitudes of the first and second sensing signals to generate a difference signal and for generating a first trigger signal for a zero down-crossing of the difference signal and for generating a second trigger signal for a zero up-crossing of the difference signal, wherein the trigger signals indicate direction of travel of a metal object in the zone in relation to the first and second sensing coils 14 and 16.

The transmitter coil 12 comprises a 25 turn, 12 watt, 8 ohm impedance coil. Each of the first and second sensing coils 14 and 16 has an inductance of about 1600 mH. Preferably, the first and second sensing coils 14 and 16 are spaced apart by at least about 12 inches, and the transmitter coil 12 is spaced apart from the first and second sensing coils 14 and 16 by at least about 48 inches.

Preferably, the first and second sensing coils 14 and 16 each comprise a plurality of sensor sub-coils 20 electrically connected in series to form a substantially linear array of sub-coils. Utilizing multiple sub-coils for each sensor coil, advantageously, provides the metal detector 10 of the present invention with a broader vertical range of detection. Existing systems utilize one continuous winding for the sensing coil and typically one winding only provides a vertical detection range of about one foot. Using multiple sub-coils per sensing coil provides a vertical detection range of at least about 3 feet.

Preferably, up to 10 sensing sub-coils 20 are electrically connected in series to form either the first or the second sensing coils 14 and 16 of the detector system 10. The inductance of each sub-coil 20 can be about 160 mH with a Q of about 5. Adjacent sub-coils 20 are spaced apart from one another by about 8 inches. The spacing between adjacent sub-coils 20 can be increased or decreased depending on the dimensions of the monitoring zone.

The metal detector system 10 can further comprise a transmitter circuit 22 electrically connected to the transmitter coil 12 for exciting the transmitter coil 12 to generate a magnetic field in the zone. The transmitter circuit 22 includes an oscillator circuit 24 for generating excitation signals of a frequency of about 1 KHz to about 1.5 KHz for detecting tungsten alloys. Because firearms include substantial traces of tungsten alloys, the metal detector of the present invention, advantageously, can differentiate between firearms and benign metal objects such as keys and coins. Preferably, the frequency of the excitation signals is about 1.2753 KHz to provide increased sensitivity to tungsten alloys.

The transmitter circuit 22 further includes an amplifier 26 electrically connected to the oscillator circuit 24 to amplify the excitation signal. The amplified signal is directed to the transmitter coil 12 to generate a magnetic field in the zone to be monitored.

Preferably, the sensing circuit 18 includes a differential amplifier 28 responsive to the first and second sensing signals from the first and second sensing coils 14 and 16, respectively, for generating the difference signal representative of the difference between the amplitude of the first and second sensing signals. The sensing circuit 18 further comprises a detector 30 responsive to the differential amplifier 28 for detecting a zero down-crossing of the difference signal to generate the first trigger signal and for detecting a zero up-crossing of the difference signal to generate the second trigger signal. A differential amplifier amplifies difference signals but rejects common-mode signals.

The metal detector system 10 can further comprise an alarm circuit responsive to the first and second trigger signals for informing a user of the presence of a metal object in the zone and of the direction of travel of the metal object in the zone in relation to the first and second sensing coils.

Figure 4:
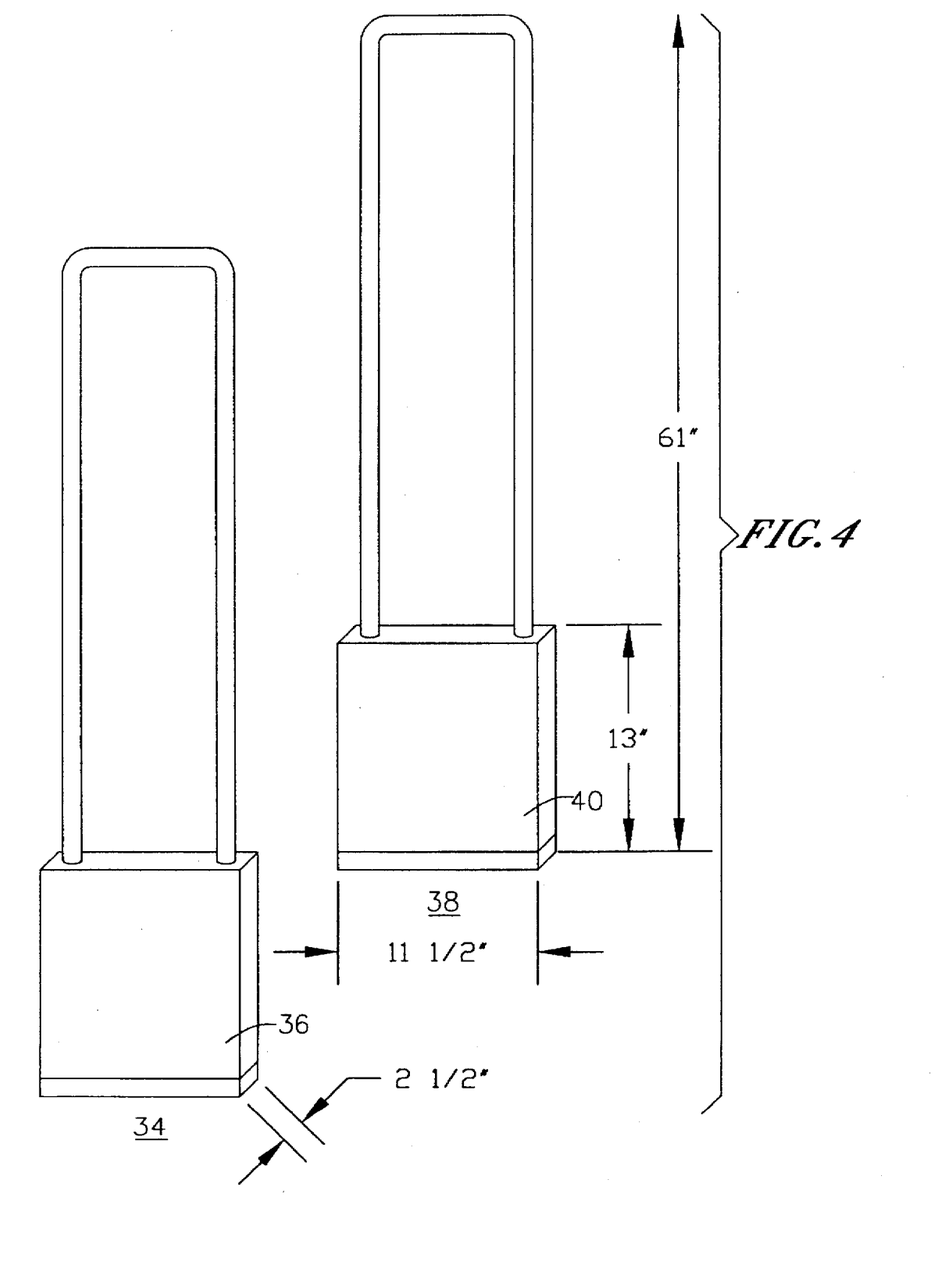
FIG. 4 is a perspective view of an example metal detector system according to the present invention.

Referring to FIG. 4 a perspective view of placement of the transmitter and sensing coils of an example metal detector system according to the present invention is shown. The transmitter coil 12 is housed in a transmitter station 34. The transmitter station 34 has a base 40 which is 2.5 inches wide, 11.5 inches long and 13 inches high. The transmitter coil 12 is wound in a substantially rectangular shape about 11.5 inches wide and 48 inches high. The transmitter coil 12 is disposed on the base 36 of the transmitter station 34 as shown. The transmitter circuit 22 can be enclosed in the base 36 of the transmitter station 34.

The sensing coils 14 and 16 are housed in a sensing station 38 having a base 40 with similar dimensions to the base 36 of the transmitter station 34. The sensing coils 14 and 16 are disposed on the base 40 about 11.5 inches apart. Each sensing coil is about 48 inches high. The transmitter and sensing stations are spaced about 48 inches apart. The sensing circuit can be enclosed in the base of the sensing station.

Figure 5:
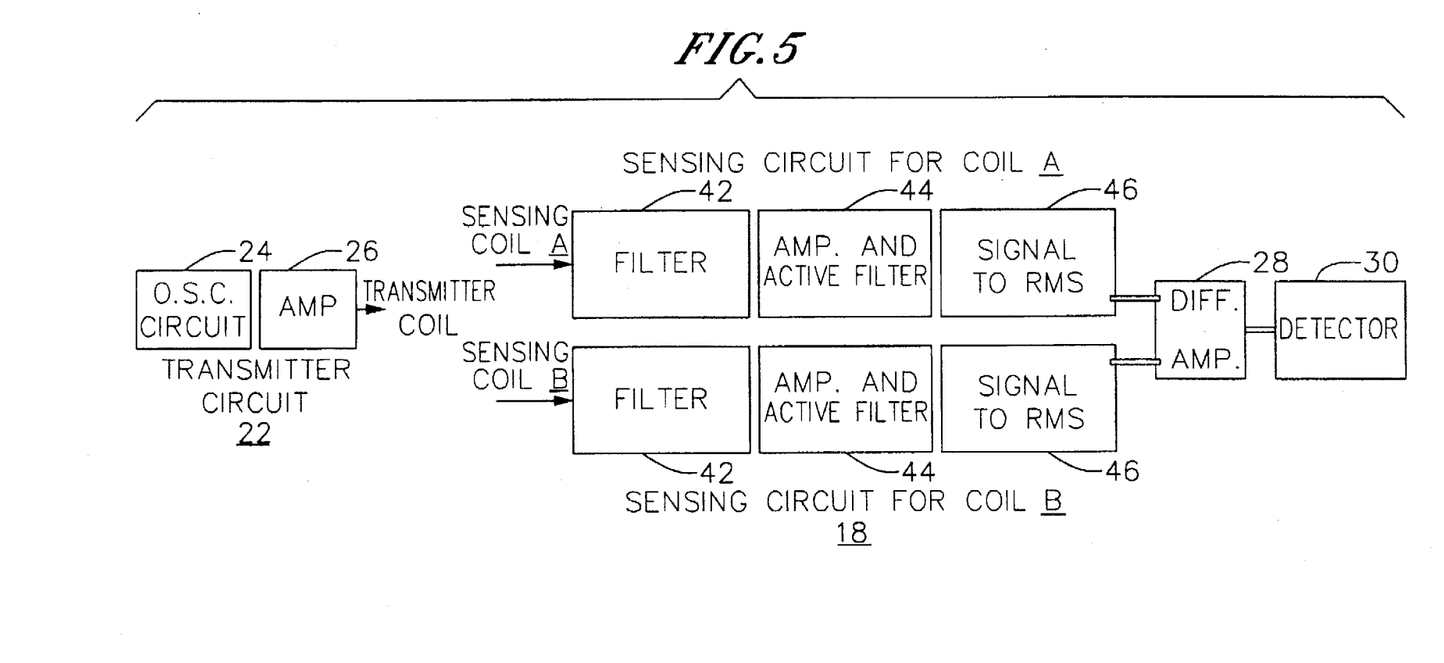
FIG. 5 is a block diagram of an example transmitter circuit, sensing circuit, and driver circuit of the detector of FIG. 4.

FIG. 5 illustrates a block diagram of example transmitter and sensing circuits of the metal detector of FIGS. 3–4. The transmitter circuit 22 includes an oscillator 24 circuit connected in series with an amplifier 26 as shown. The sensing circuit 18 includes a high pass filter 42, an amplifier and active filter 44, and an RMS circuit 46 electrically connected in series as shown in FIGS. 3–4. The sensing circuit further includes a differential amplifier 28 as shown.

Figure 6:
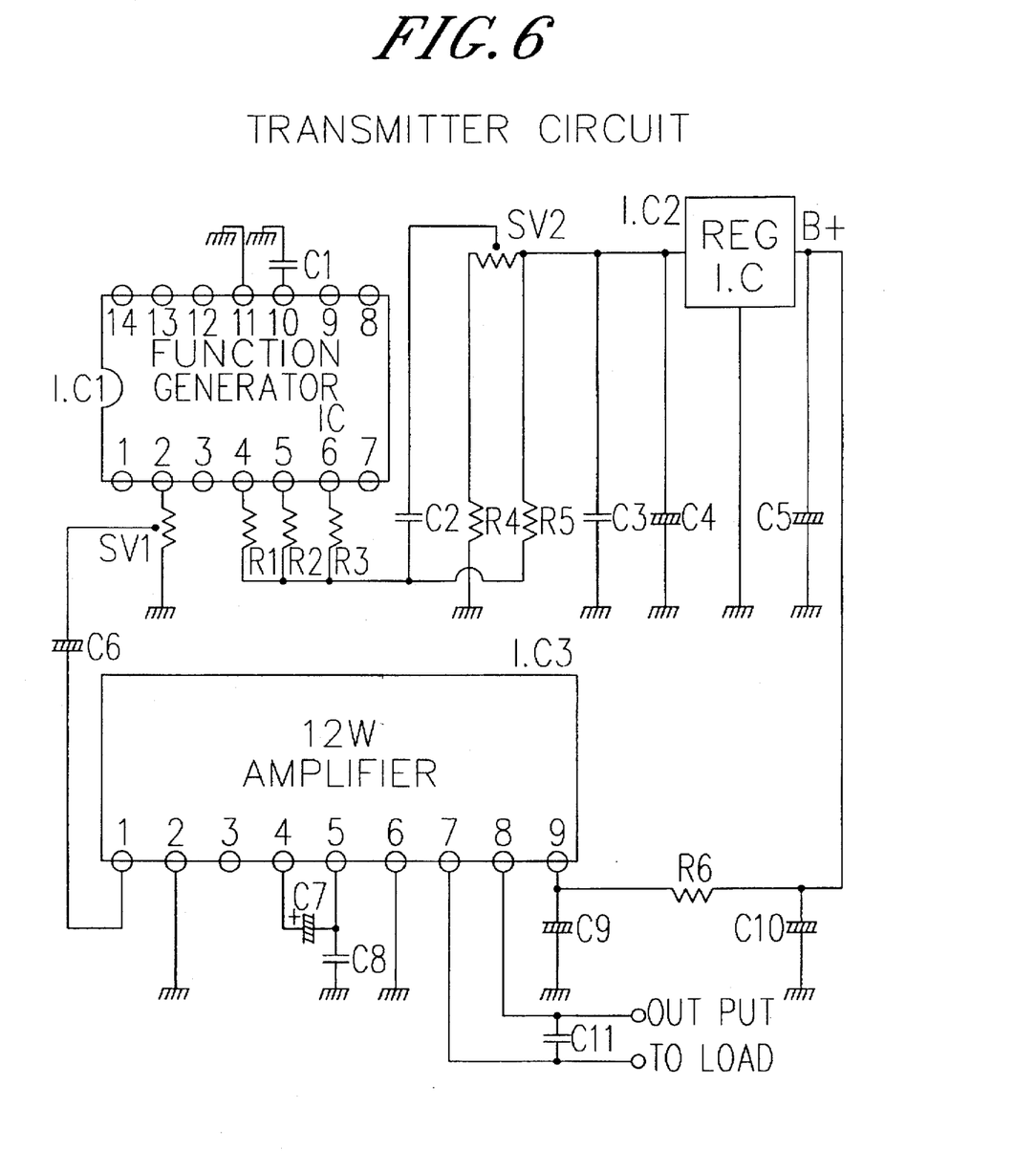
FIG. 6 illustrates a detailed schematic of the transmitter circuit of FIG. 5.

FIG. 6 illustrates a detailed schematic of the transmitter circuit of FIG. 5. Transmitter circuits are well known to the practitioners in the art and examples of suitable transmitter circuits can be found in U.S. Pat. Nos. 3,707,672 and 3,763,424.

Figure 7:
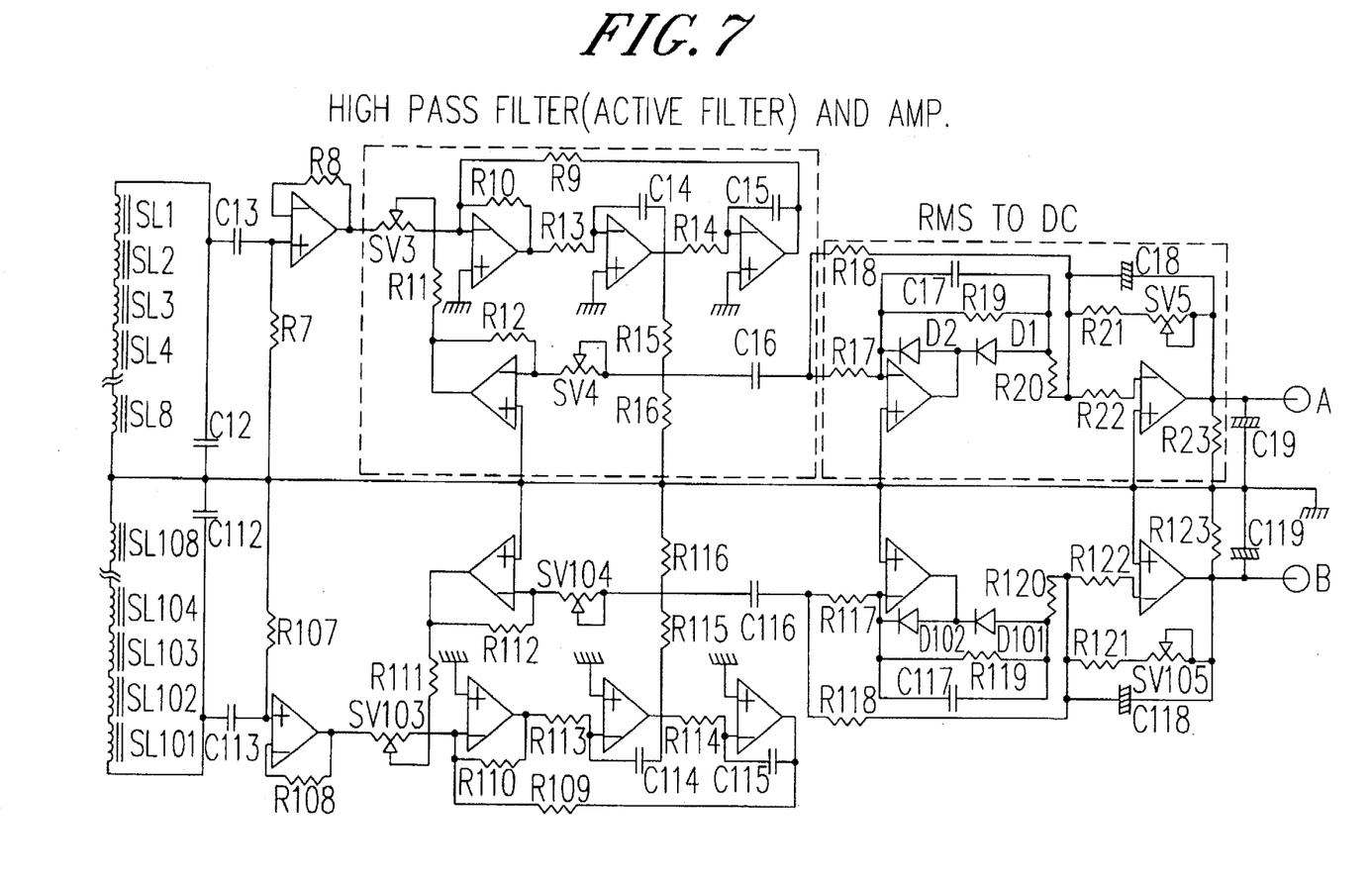
FIG. 7 illustrates a detailed schematic of the sensing circuit of FIG. 5.

FIG. 7 illustrates a detailed schematic of the sensing circuit of FIG. 5. The high pass filter blocks low frequency frequencies of about 900 Hz or less from entering the sensing circuit. The active filter and amplifier function as a bandpass filter to tune the sensing circuit to the frequency of the transmitter circuitry. The band pass filter covers a range of about 0.1 Hz to about 10 Hz. The RMS circuit converts peak to peak voltage signals to RMS DC (Direct Current). The DC swings between a negative and a positive voltage.

Figure 8:
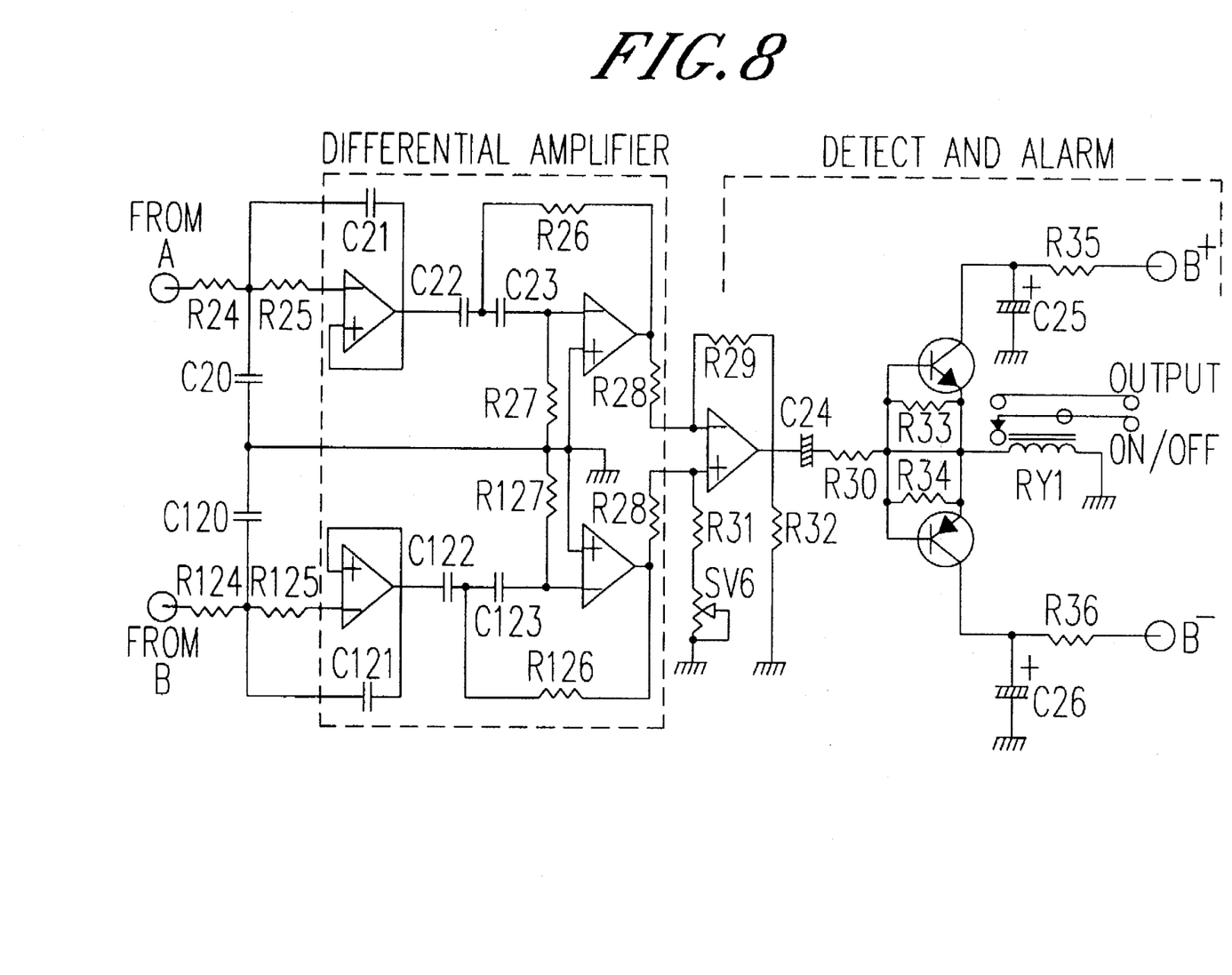
FIG. 8 illustrates a detailed schematic of the drive circuit of FIG. 5.

FIG. 8 illustrates a detailed schematic of the differential amplifier circuit of FIG. 5. The differential amplifier receives the DC A and B from the sensing circuit, one per sensing coil.

Figure 9:
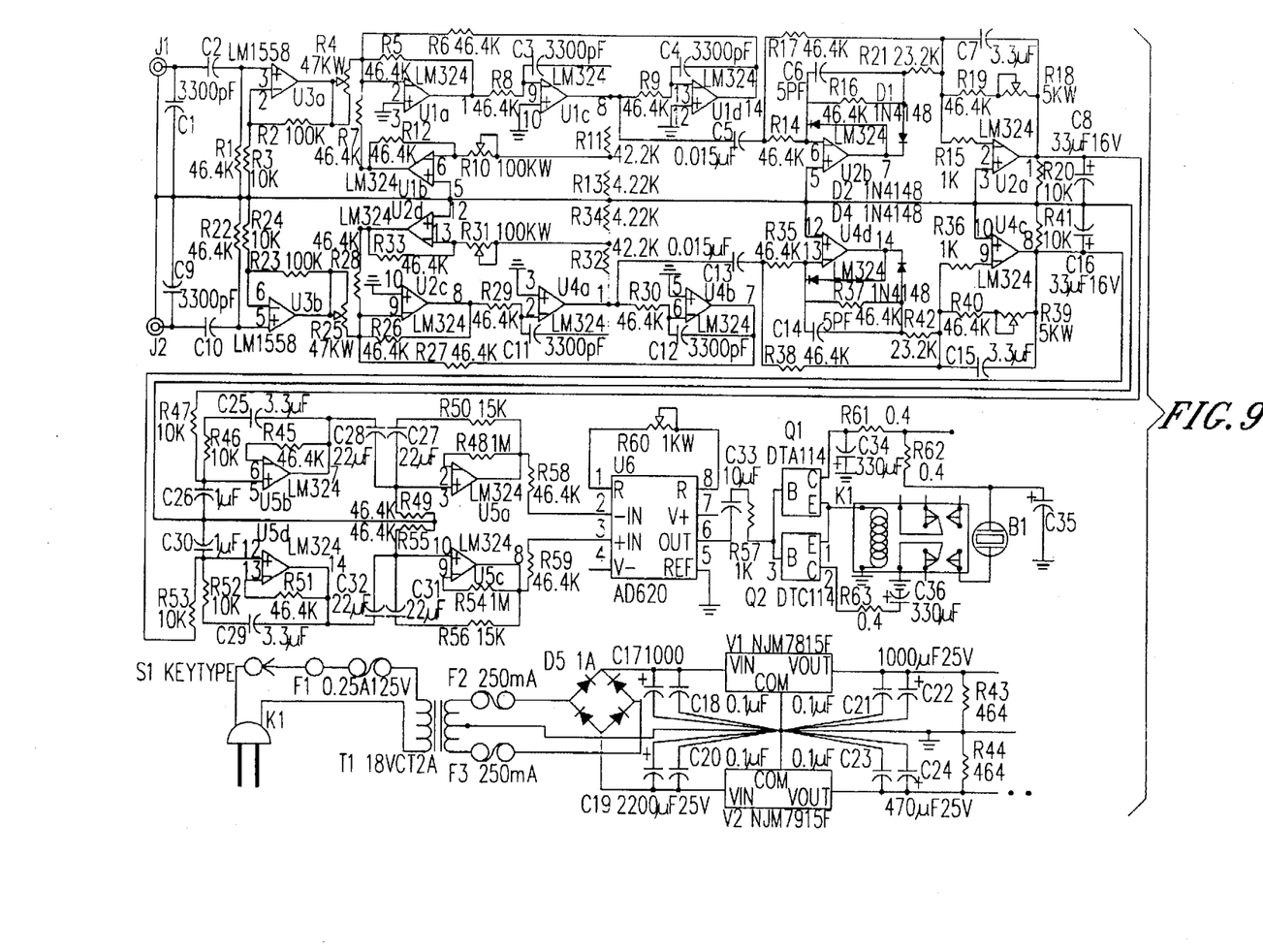
FIG. 9 is an illustrated schematic diagram of an example embodiment of receiver circuit.
Figure 10:
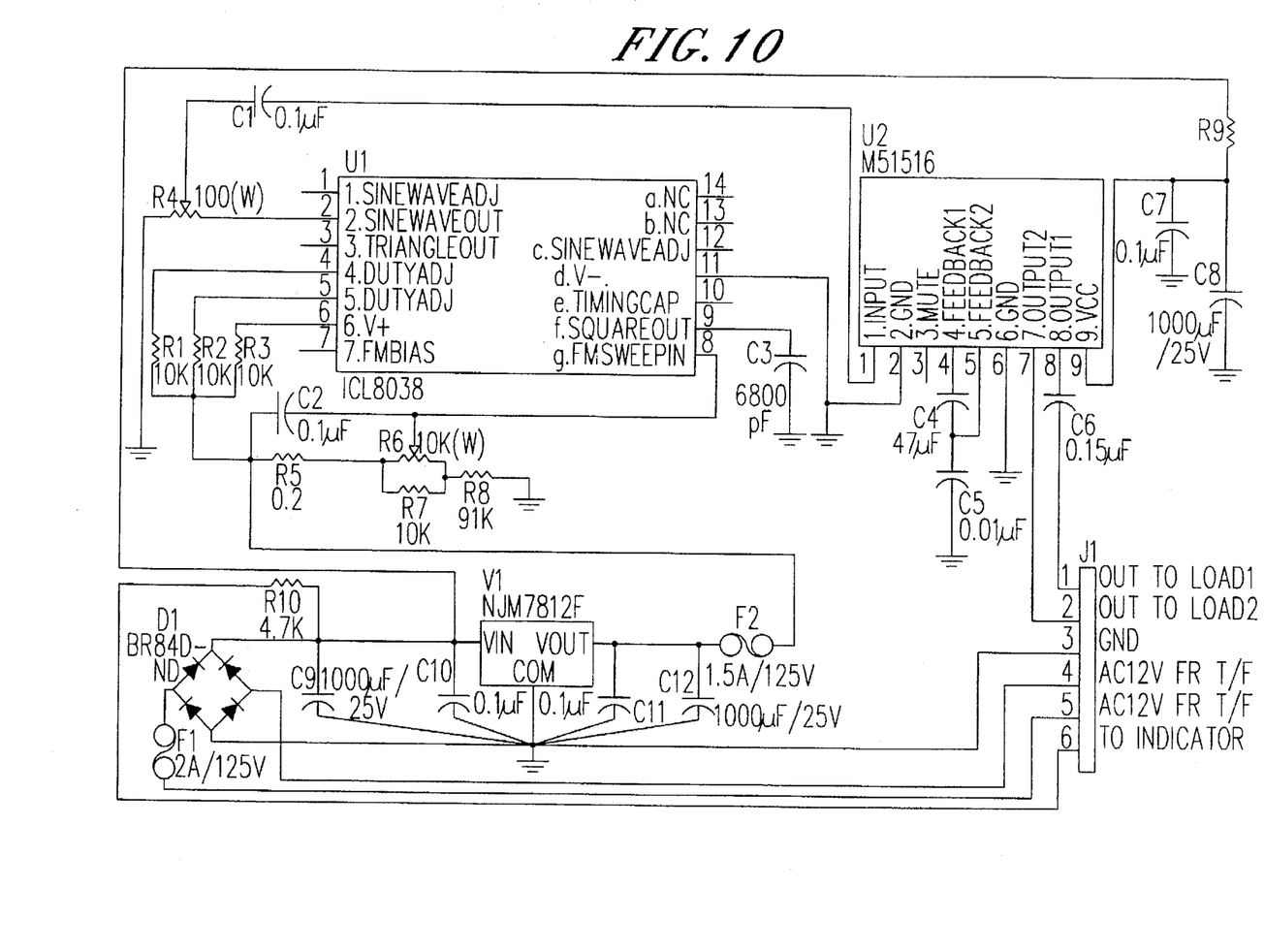
FIG. 10 is an illustrated schematic diagram of an example embodiment of transmitter circuit.

Referring now to FIGS. 9–10, there are illustrated schematic diagrams of an example embodiment of receiver and transmitter circuits, respectively, according to the present invention. Table 1 illustrates the parts list for the schematic of FIG. 9, and Table 2 illustrates the parts list for the schematic of FIG. 10.

Although the present invention has been described in considerable detail with reference to certain preferred versions thereof, other versions are possible. Therefore, the spirit and scope of the appended claims should not be limited to the description of the preferred versions contained herein.

TABLE 1

ANALOG\LM324----U1,U2,U4,U5
ANALOG\LM1558----U3
ANADEV\AD620----U6
*----C1,C9
3300PF----C2,C3,C4,C10,C11,C12
46.4K----R1,R5,R6,R7,R8,R9,R12,R14,R16,R17,R19,R22,R26,R27,R28,
R29,R30,R33,R35,R37,R38,R40,R45,R49,R51,R55,R58,R59
100K----R2,R23
10K----R3,R20,R24,R41,R46,R47,R52,R53
47KW----R4,R25
100KW----R10,R31
42.2K----R11,R32
4.22K----R13,R34
0.015µF----C5,C13
1N4148----D1,D2,D3,D4
1K----R15,R36,R57
5PF----C6,C14
5KW----R18,R39
3.3µF----C7,C15,C25,C29
33µF16V----C8,C16
23.2K----R21,R42
1A----D5
0.25A125V----F1
KEYTYPE----S1
18VCT2A----T1
NJM7815F----V1
1000----C17
0.1µF----C18,C20,C21,C23
NJM7915F----V2
2200µF25V----C19
1000µF25V----C22
470µF25V----C24
464----R43,R44
PLUG-GND----K1
250MA----F2,F3
1µF----C26,C30
1M----R48,R54
15K----R50,R56
22µF----C27,C28,C31,C32
DTA114----Q1
DTC114----Q2
10µF----C33
1KW----R60
0.4----R61,R62,R63
330µF----C34,C36

TABLE 2

M51516----U2
INTERSIL\ICL8038----U1
10K(W)----R6
0.2----R5
10K----R7,R1,R2
91K----R8
0.1µF----C2,C1,C11,C10,C7
6800PF----C3
100K(W)----R4
47µF----C4
0.01µF----C5
1000µF/25V----F2
2A/125V----F1
0.15µF----C6
4.7K----R10
1----R9
BR84D-ND----D1
10----R3
NJM7812F----V1

What is claimed is:

1. A metal detector system for detecting metal objects in a monitoring zone, the metal detector system comprising:

(a) a transmitter coil for generating a magnetic field in the zone to be monitored, the coil being disposed on a first side of the zone;

(b) a first sensing coil disposed on a second side of the zone opposed to the first side, the first sensing coil generating a first sensing signal in response to perturbations in the magnetic field caused by the presence of a metallic object in the zone;

(c) a second sensing coil disposed on the second side of the zone, the second sensing coil being spaced apart from the first sensing coil, the second sensing coil generating a second sensing signal in response to perturbations in the magnetic field caused by the presence of a metallic object in the zone; and (d) a sensing circuit for comparing the amplitudes of the first and second sensing signals to generate a difference signal and for generating a first trigger signal for a zero down-crossing of the difference signal and for generating a second trigger signal for a zero upcrossing of the difference signal, wherein the trigger signals indicate direction of travel of a metal object in the zone in relation to the first and second sensing coils.

2. The metal detector of claim 1 wherein the sensing circuit comprises:

(a) a differential amplifier responsive to the first and second sensing signals for generating the difference signal representative of the difference between the amplitude of the first and second sensing signals; and (b) a detector responsive to the differential amplifier for detecting the zero down-crossing of the difference signal to generate the first trigger signal and for detecting the zero upcrossing of the difference signal to generate the second trigger signal.

3. The metal detector system of claim 2 further comprising an alarm circuit responsive to the first and second trigger signals for informing a user of presence of a metal object in the zone and of the direction of travel of the metal object in the zone in relation to the first and second sensing coils.

4. The metal detector system of claim 1 further comprising a transmitter circuit electrically connected to the transmitter coil for exciting the transmitter coil to generate a magnetic field in the zone, the transmitter circuit including an oscillator circuit for generating excitation signals of a frequency of about 1 KHz to about 1.5 KHz for detecting tungsten alloys.

5. The metal detector system of claim 4 wherein the frequency of the excitation signals is about 1.2753 KHz.

6. The metal detector system of claim 1 wherein the first sensing coil comprises a plurality of sensor coils electrically connected in series to form a substantially linear array of coils, wherein adjacent sensor coils are spaced from one another.

7. The metal detector of claim 6 wherein the spacing between adjacent sensor coils is at least about 5 inches.

8. The metal detector system of claim 1 wherein the second sensing coil comprises a plurality of sensor coils electrically connected in series to form a substantially linear array of coils, wherein adjacent sensor coils are spaced from one another.

9. The metal detector system of claim 8 wherein the spacing between adjacent sensor coils is at least about 5 inches.

10. The metal detector system of claim 1 wherein the spacing between the first sensing coil and the second sensing coil is at least about 12 inches.

11. A metal detector system for detecting metal objects in a monitoring zone, the metal detector system comprising:

(a) a transmitter coil for generating a magnetic field in the zone to be monitored, the coil being disposed on a first side of the zone;

(b) a first sensing coil disposed on a second side of the zone opposed to the first side, the first sensing coil generating a first sensing signal in response to perturbations in the magnetic field caused by the presence of a metallic object in the zone;

(c) a second sensing coil disposed on the second side of the zone, the second sensing coil being spaced apart from the first sensing coil, the second sensing coil generating a second sensing signal in response to perturbations in the magnetic field caused by the presence of a metallic object in the zone;

(d) a transmitter circuit electrically connected to the transmitter coil for exciting the transmitter coil to generate a magnetic field in the zone, the transmitter circuit including an oscillator circuit for generating excitation signals of a frequency of about 1 KHz to about 1.5 KHz for detecting tungsten alloys;

(e) a differential amplifier responsive to the first and second sensing signals for generating a difference signal representative of the difference between the amplitude of the first and second sensing signals; and (f) a detector responsive to the differential amplifier for detecting a zero down-crossing of the difference signal to generate a first trigger signal and for detecting a zero upcrossing of the difference signal to generate a second trigger signal, wherein the trigger signals indicate direction of travel of a metal object in the zone in relation to the first and second sensing coils.

12. The metal detector system of claim 11 wherein the spacing between the first sensing coil and the second sensing coil is at least about 12 inches.

13. The metal detector system of claim 12 wherein:

(a) the first sensing coil comprises a plurality of sensor coils electrically connected in series to form a substantially linear array of coils, wherein adjacent sensor coils are spaced from one another by at least about 5 inches; and (b) the second sensing coil comprises a plurality of sensor coils electrically connected in series to form a substantially linear array of coils, wherein adjacent sensor coils are spaced from one another by at least about 5 inches.

14. The metal detector system of claim 13 wherein the frequency of the excitation signals is about 1.2753 KHz.

15. The metal detector system of claim 14 further comprising an alarm circuit responsive to the first and second trigger signals for informing a user of presence of a metal object in the zone and of the direction of travel of the metal object in the zone in relation to the first and second sensing coils.

* * * * *